Oct. 19, 1948.　　　　　　　　　C. S. JORDAN　　　　　　　　2,451,836
ROTARY COUNTERBALANCED EGG-CARRIER MECHANISM FOR
CLASSIFYING EGGS ACCORDING TO WEIGHT
Filed Oct. 14, 1944　　　　　　　　　　　　　　　　　　3 Sheets-Sheet 1

INVENTOR,
Curtis S. Jordan
ATTORNEY

Oct. 19, 1948.  C. S. JORDAN  2,451,836
ROTARY COUNTERBALANCED EGG-CARRIER MECHANISM FOR
CLASSIFYING EGGS ACCORDING TO WEIGHT
Filed Oct. 14, 1944  3 Sheets-Sheet 2

INVENTOR,
Curtis S. Jordan
ATTORNEY.

Oct. 19, 1948.   C. S. JORDAN   2,451,836
ROTARY COUNTERBALANCED EGG-CARRIER MECHANISM FOR
CLASSIFYING EGGS ACCORDING TO WEIGHT
Filed Oct. 14, 1944   3 Sheets-Sheet 3
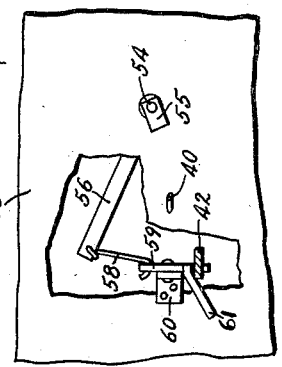
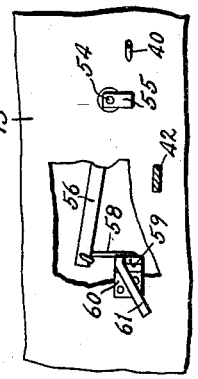
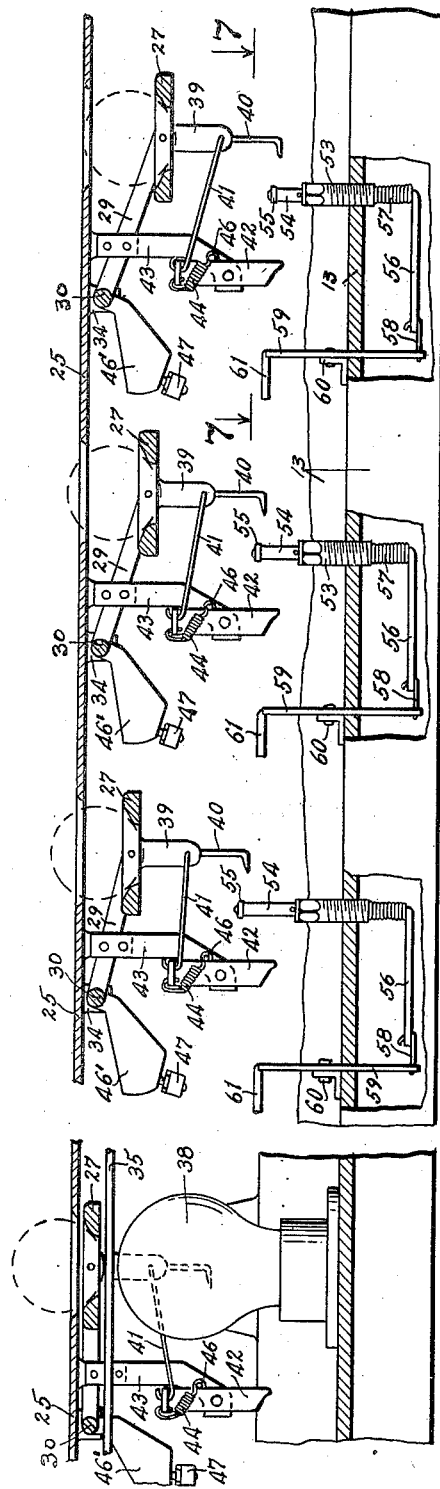
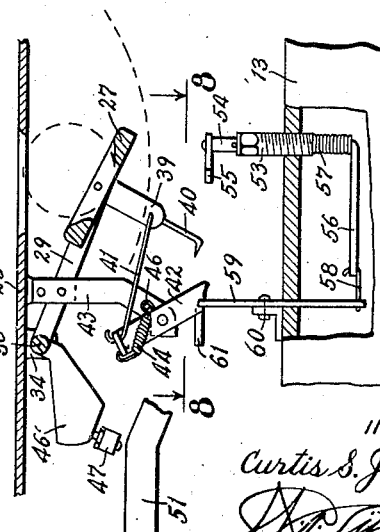
INVENTOR,
Curtis S. Jordan
ATTORNEY.

Patented Oct. 19, 1948

2,451,836

UNITED STATES PATENT OFFICE 2,451,836

ROTARY COUNTERBALANCED EGG-CARRIER MECHANISM FOR CLASSIFYING EGGS ACCORDING TO WEIGHT

Curtis S. Jordan, Maywood, Calif.

Application October 14, 1944, Serial No. 558,672

5 Claims. (Cl. 209—121)

This invention relates to Rotary counterbalanced egg-carrier mechanism for classifying eggs according to weight, and it has among its salient objects: to provide a machine in which there is a turn table provided with egg-receiving carriers, pivotally mounted and controlled so that, according to the weight of the egg, will the mechanism be automatically actuated to deposit the egg in its proper classification; to provide in such a machine an improved system of egg carriers, with their supporting mechanisms, their tripping means, and their control features all co-operating to make for simplicity, accuracy and economy of operation; and, in general, to provide a new and improved egg classifying machine which will handle a maximum number of eggs with a minimum amount of attention and supervision.

In order to explain my invention, I have illustrated one practical embodiment thereof on the accompanying three sheets of drawings which I will now describe. In the drawings:

Figure 4 is a fragmentary, vertical sectional view taken on the line 4—4 of Fig. 2;

Figure 5 is a vertical sectional view taken on the curved line 5—5 on Fig. 2, showing three different positions of the egg carriers;

Figure 6 is a fragmentary sectional view similar to the showing in Fig. 5, showing a further stage of movement of related parts;

Figure 7 is a fragmentary view looking down on the line 7—7 on Fig. 5, with a part broken out;

Figure 8 is a similar view of the parts in the positions seen in Fig. 6, on line 8—8;

Figure 3:
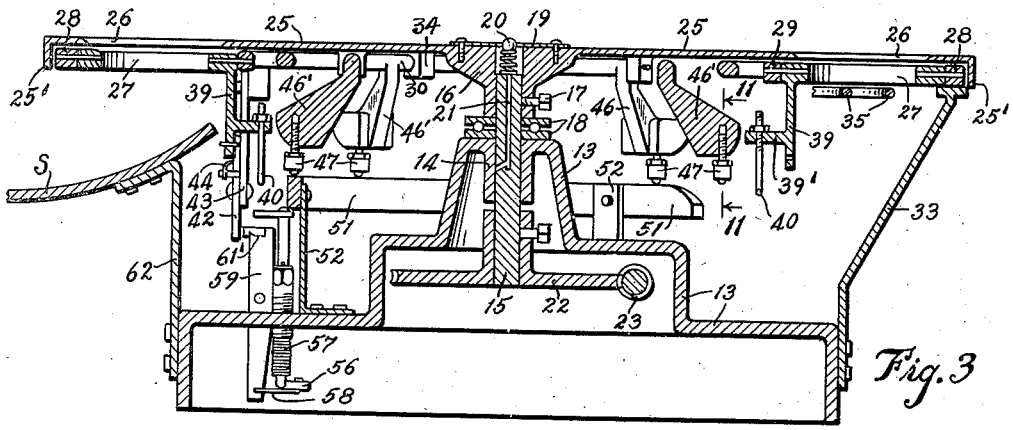
Figure 3 is a vertical sectional view, taken on the line 3—3 of Fig. 2.

Referring now in detail to the drawings, the invention as here shown for explanatory purposes is mounted upon a pyramidal base 13, shown in vertical section in Fig. 3, which provides a vertical bearing 14, for a shaft 15, mounted therein and held in position by means of a head 16, mounted thereon and held by a set screw 17, with ball-bearing 18 between it and the top of the base 13. A removable plate 19 is secured to said head, with a spring-held ball valve 20, controlling an oiling channel 21.

Figure 1:
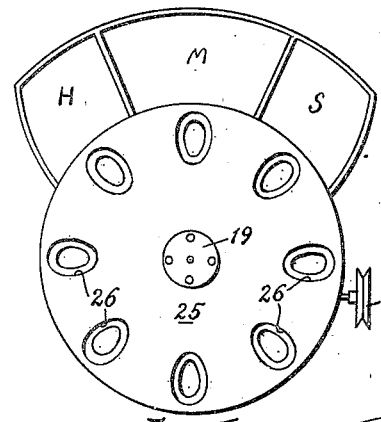
Figure 1 is a top plan view of a machine embodying my invention.

On the lower end of said shaft 15, is mounted a worm gear 22, to be driven by a worm 23, in a well known manner, said worm being provided with a pulley 24, Fig. 1.

The top plate of the machine is designated 25, and is indicated as integral with the head 16, said top plate having a peripheral flange 25' and is also provided with a series of openings 26, through which eggs can be placed upon egg carriers 27.

These egg carriers are pivotally supported between two arms 28 and 29, extended laterally from shafts or rods 30, 30, in the same plane and at acute angles relative to each other and each of which is rotatably supported at one end, as at 31, in the flange 25' of the top plate, and at its other end, said rod or shaft 30 is supported rotatably in a lug 34, on the underside of the top plate 25, whereby said shafts can be rotated to raise and lower the egg carriers supported between the arms 28 and 29, on each of said shafts. Each of these egg carriers is supported in the same manner and similar parts have the same reference numerals in all places.

Figure 2:
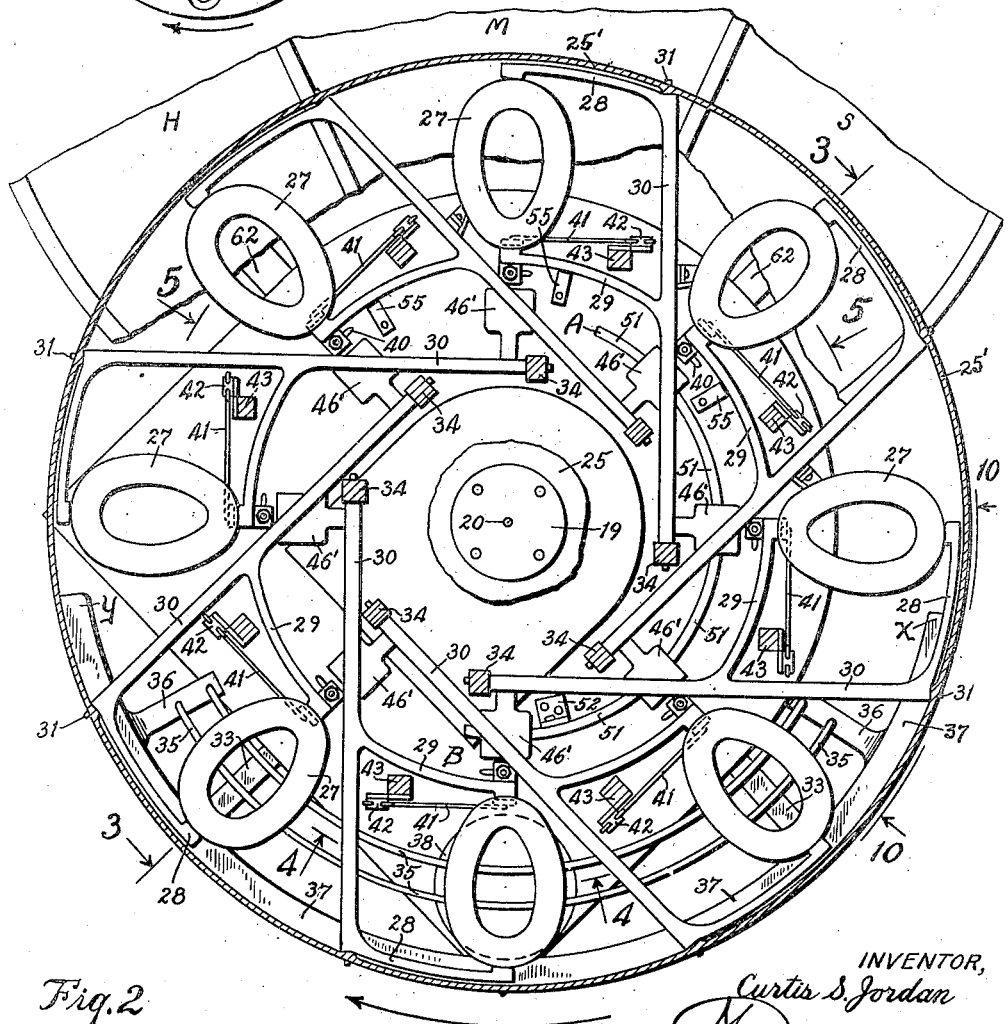
Figure 2 is a greatly enlarged top plan view with the top plate broken away except around the center thereof.

Immediately underneath the level of said egg carriers 27 at one side of the machine, being the lower side as seen in Fig. 2, are two wire tracks or supports 35, 35, supported by lugs or arms 36, 36, extending inwardly from a curved bearing plate or member 37, around and upon which the outer arms 28 ride from the point X to the point Y, while eggs placed in the egg carriers 27, 27, move on the tracks 35, 35, and over an electric lamp 38, for candling purposes, in a manner well understood.

Each of said carriers has a downwardly extending leg 39, with a lug 39' on its side, through which is an adjustable extension or foot 40, as seen in Figs. 3, 4 and 5. The lower end of said leg 39, in each case, is connected by means of a link 41 with the upper end of an operating lever 42, pivotally supported on a downwardly extending member 43, from the underside of the top plate 25. A coiled spring 44 is also connected with the upper end of said lever 42, at one end and at its other end said spring is connected with the member 43, with pin 46, and functions to normally move and hold said operating lever 42 in upright position, as seen in Fig.

5, after it has been moved to tilt the egg carrier, as again referred to.

Connected with each of the rods or shafts 30, is a weight 46', which operates in opposition to the weight of the egg in the egg carrier 27. Each weight has at its lower side an adjustable ball bearing contact member 47, seen in enlarged section in Fig. 11.

Said ball contact member includes a screw 48, to screw into said weight, a ball retaining cap 49, a ball 50 projecting sufficiently for anti-friction purposes, and a lock nut 47, which also designates the entire device.

Mounted under said weights, in the base, is a track member 51, as seen in Figs. 2 and 3, supported by suitable brackets 52, 52, and extending from A to B, Fig. 2, for the purpose of supporting the weights 46 during a part of their movement around the course of movement in order to prevent the weight from dropping down suddenly.

Mounted on said base structure 13, around a part of the circle thereof, are different trip mechanisms to be engaged and moved by the depending feet 40, on the egg carriers 27, when said foot members are depressed by the weight of the eggs in the egg carriers sufficiently to engage one of said trip members.

Figures 11, 12:
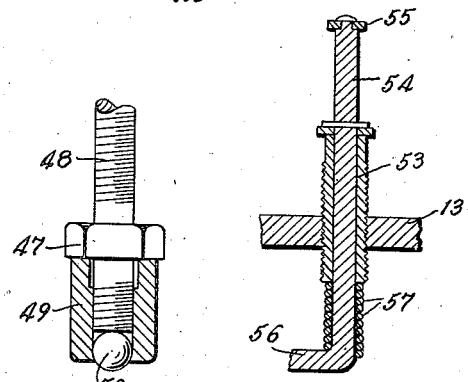
Figure 11 is a detail, on line 11—11, Fig. 3.
Figure 12 is a sectional detail on line 12—12, Fig. 9.

These trip members are shown in successive positions in Fig. 5, and in operation in Fig. 6. Each comprises a screw sleeve 53, through the base 13, as seen in Fig. 3, with a shaft 54 therethrough provided at its upper end with a projecting finger 55, and at its lower end with a laterally extending arm 56, with a coiled spring 57 for normally holding said shaft in inactive position, as seen in Fig. 5. The detailed construction is shown in Fig. 12. The end of said arm 56 is connected by means of a link 58, with a lever 59, pivotally mounted on a lug 60 on said base, as seen, said lever having at its upper end a laterally projecting member 61.

Said screw sleeves 53, are adjusted to different heights, as will be seen in the three positions shown in Fig. 5, for engaging the foot members 40, on the egg carriers 27, when depressed to different positions by different weights of the eggs placed therein, and as also indicated in the three different positions in said Fig. 5, where three eggs of different weights are indicated in light broken circular lines.

With the parts in the positions shown in Fig. 5, and also as seen in Fig. 7, looking down on this fragmentary view on line 7—7 of Fig. 5, the foot 40 will engage the projecting finger 55, when it reaches it, as seen in Fig. 7, and turn it to the position shown in Fig. 8, which moves the laterally extending arm 56, and rocks the lever 59 from its normal position to the position indicated in Fig. 8, in the path of the depending operating lever 42, so that as said top plate 25 and said egg carriers 27 continue to move to the position indicated in Fig. 6, said depending lever 42 engages the angle part 61 of said moved lever 59, which rocks said lever 42 and through its links 41, tilts said egg carrier 27 for discharging the egg therein into the proper department, heavy, H, medium, M, or small, S, as shown in Fig. 1, and represented by the curved light broken line in said Fig. 6.

Figure 9:
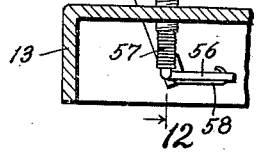
Figure 9 is a fragmentary sectional view taken on line 9—9, of Fig. 8.

Referring to Fig. 5, and to the left end thereof, it will be seen that the small or light egg has depressed the egg carrier accordingly, but that the vertical shaft 54 is taller than the others, in order to be in the path of the foot 40, as indicated. In the second or middle position, a medium egg has been indicated and has depressed the egg carrier a little further down than the light egg, and that the position of the middle vertical shaft 54 is such as to be engaged thereby, and that the heavy egg has depressed its egg carrier 27 the farthest down and that the vertical shaft 54 is lower and will be engaged by the foot 40 on said egg carrier, as before described. Thus the different weights of eggs depress the egg carriers accordingly, and the different vertical shafts 54 are positioned to be engaged by the foot member 40, according to the position thereof. The upper end of said pivoted lever 59, it will be noted, has an angle portion from one side of the end thereof, leaving the end as a shoulder or upper end, which is engaged by the tapering lower end of the depending lever 42, as will best be understood from Figs. 8 and 9. As soon as said depending lever 42 engages and is moved by the upper end of said pivoted lever 59, for tilting the egg carrier, as seen in Fig. 6, said depending lever 42 will engage the angle part 61 of said pivoted lever 59 and move it to its normal position, shown in Fig. 7.

Figure 10:
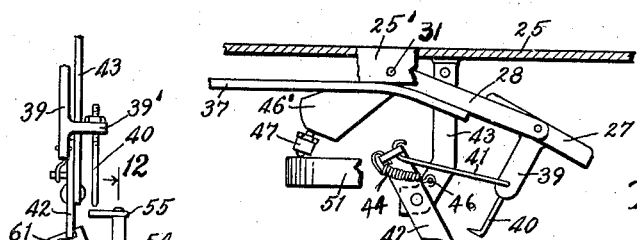
Figure 10 is a fragmentary view as seen on line 10—10, Fig. 2.

As the egg is discharged from the carrier 27, the weight 46' will rest upon the track 51 and move thereon until the outer arm 28, of the egg carrier support reaches and rides on the bearing member 37, as seen in Fig. 2. Said weight supporting track 51 is also seen in Fig. 3. The curved bearing member 37 is seen in Fig. 10, with one of said arms 28 moving thereonto. In Fig. 6, where the egg is about to be discharged, it will be seen that the weight will then ride on the track 51, and this will prevent the weight from dropping rather suddenly and consequently thrusting the egg carrier 27 upwardly before it is adjusted into a level position.

It will be understood that the turn table and egg carriers are rotated clockwise, as indicated by the arrow at the bottom of Fig. 2, and that the eggs are fed to the egg carriers as they move over the tracks 35 and to the electric light for candling purposes. By reference to Fig. 2, the egg carrier 27 which is at the receptacle H, for the heavy eggs, is supported by the tangential shaft which has its weight 46' just moving over the track 51, positioned to support the weights immediately after the egg has been discharged in each instance. As an egg carrier reaches the receptacle S for the small eggs, its shaft has its weight 46' positioned to move down the inclined part of said track 51 and off the end thereof, whereupon it raises its egg.

An important feature of this invention is a structure in which a series of rock shafts are tangentially positioned relative to each other, with the extended arms at one end and a weight at the other end, in opposition to each other. This gives a compactness with sufficient clearance so that the extended arms can rock up and down as the shaft is rocked, and saves much space, while providing a practical arrangement of a series of egg carriers.

Another important feature of the invention is a tripping mechanism, including cooperating parts carried by the revoluble structure and the egg carriers, for setting a tripping mechanism mounted on the base structure, whereby during the revolving movement of said structure said mechanisms are first set and later actuated for discharging the eggs from the egg carriers.

I am aware that many changes in the details

I claim:

1. In an egg classifying machine, a supporting structure, a revoluble structure mounted thereon with means for turning it, a plurality of shafts mounted thereon, in the same plane and at acute angles relative to each other, around said revoluble structure to move therewith, said shafts being rockable on their longitudinal axes, each of said shafts having at one side thereof a pair of literally extended arms at one end and rigid therewith, an individual egg carrier held between the free ends of each pair of arms to be raised and lowered about the axis of its shaft as said shaft is rocked, a weight rigidly connected with each shaft to counterbalance the weight of the egg in its egg carrier, said weight operating at the opposite end of said shaft, and on the opposite side thereof adjustable tripping mechanisms around the path of travel of said egg carriers, to be engaged by depending parts carried by said egg carriers, and depending parts connected with said egg carriers to selectively engage and be actuated by said tripping mechanisms according to the adjustments of said tripping mechanisms, whereby to discharge eggs in predetermined places.

2. In an egg classifying machine, a support, a table structure revolubly mounted thereon, with means for revolving it, a series of shafts rotatably mounted on said structure, in the same plane and at acute angles relative to each other, each shaft having at one end and from one side thereof a pair of laterally extended arms, and at its other end a weight to counterbalance the weight carried by said arms, an egg carrier pivotally held between the free ends of each pair of arms, in opposition to the action of the weight at the opposite end of its shaft, a tripping element connected with each egg carrier, a series of spring held tripping mechanisms around the path of travel of said egg carriers, said tripping mechanisms being adjustable to be engaged by the tripping elements on said egg carriers selectively according to the depressed positions of said egg carriers, said tripping mechanisms operating to tilt said egg carriers to discharge said eggs at predetermined places, and a track disposed in position under the counterbalance weights to support the same when released by the discharge of articles from the respective carriers.

3. In an egg classifying machine, the combination with a supporting structure and a revoluble structure mounted thereon, with means for turning it, of a plurality of shafts rotatably mounted thereon in the same plane and at acute angles relative to each other, having each a weight at one end, at the side thereof, tending to rock said shaft in one direction and a pair of laterally extended arms at its other end, and at the other side thereof, with an egg carrier pivotally held between the free ends of each pair of arms, and tending to rock said shaft in the opposite direction, and adjustable spring tripping mechanisms around the path of travel of said egg carriers, positioned to engage and trip said egg carriers at different adjusted positions.

4. In an egg classifying machine, the combination with a supporting structure and a revoluble structure mounted thereon with means for revolving it, of a series of rotatably mounted shafts thereon in the same plane and at acute angles relative to each other, each having at one end a pair of laterally extended rigid arms with an egg carrier pivotally supported therebetween, and at its other end on the opposite side thereof, having a weight connected rigidly therewith to function in opposition to the weight of an egg in its egg carrier, a tripping mechanism carried on the underside of said revoluble structure and including a pivoted lever with spring means normally holding it in one position, said lever being connected with the egg carrier adjacent thereto, and a series of tripping mechanisms positioned around the path of travel of said egg carriers and adjustable to different positions to be engaged by the tripping mechanisms carried by said revoluble structure, whereby said egg carriers are selectively tilted by said tripping mechanisms according to the adjusted positions thereof and according to the weight of the egg in said egg carriers.

5. In an egg classifying machine, a support, a revoluble structure thereon with means for turning it, a series of revoluble shafts mounted thereon, each shaft having a pair of laterally extended arms rigid therewith at one end thereof and a weight at the other end to counterbalance said arms, an egg carrier pivotally supported between each pair of arms and having a depending part for tilting the same to discharge an egg therefrom, a series of tilting mechanisms around said support, in the path of travel of said egg carriers, each mechanism including a vertical shaft, adjustable in said support and having a trip finger at its upper end, and a pivoted lever operatively connected with the lower end of said vertical shaft, said pivoted lever having a tripping element at its upper end and adapted to be moved as said vertical shaft is turned, and a pivoted lever carried on the underside of said revoluble structure and connected with the egg carrier near it, said egg carrier having a depending part positioned to selectively engage and turn the trip finger on said vertical shaft for moving said pivoted lever having the tripping element at its upper end into position to be engaged by the pivoted lever carried on the underside of said revoluble structure, for tilting said egg carrier to discharge the egg therein.

CURTIS S. JORDAN.

REFERENCES CITED

The following references are of record in the file of this patent:

UNITED STATES PATENTS

| Number | Name | Date |
| --- | --- | --- |
| 1,199,184 | Hubman | Sept. 26, 1916 |
| 1,355,999 | Nelson | Oct. 19, 1920 |
| 1,538,122 | Kurtz | May 19, 1925 |

FOREIGN PATENTS

| Number | Country | Date |
| --- | --- | --- |
| 473,476 | Great Britain | Oct. 13, 1937 |